US008983738B2

(12) United States Patent
Avitzur et al.

(10) Patent No.: US 8,983,738 B2
(45) Date of Patent: Mar. 17, 2015

(54) SYSTEM AND METHOD OF AUTONOMOUS OPERATION OF MULTI-TASKING EARTH MOVING MACHINERY

(75) Inventors: Oren Avitzur, Biet El (IL); Gil Shalev Balashnikov, Omer (IL)

(73) Assignee: Israel Aerospace Industries Ltd., Lod (IL)

( * ) Notice: Subject to any disclaimer, the term of this patent is extended or adjusted under 35 U.S.C. 154(b) by 200 days.

(21) Appl. No.: 13/579,691

(22) PCT Filed: Feb. 21, 2011

(86) PCT No.: PCT/IL2011/000173
§ 371 (c)(1),
(2), (4) Date: Aug. 17, 2012

(87) PCT Pub. No.: WO2011/104703
PCT Pub. Date: Sep. 1, 2011

(65) Prior Publication Data
US 2013/0006484 A1 Jan. 3, 2013

Related U.S. Application Data

(60) Provisional application No. 61/392,279, filed on Oct. 12, 2010, provisional application No. 61/307,025, filed on Feb. 23, 2010.

(51) Int. Cl.
*A01B 35/32* (2006.01)
*G06F 19/00* (2011.01)
*G05D 1/02* (2006.01)
*E02F 9/20* (2006.01)

(52) U.S. Cl.
CPC .............. *G05D 1/0274* (2013.01); *E02F 9/205* (2013.01); *G05D 1/024* (2013.01); *G05D 1/0257* (2013.01); *G05D 1/027* (2013.01); *G05D 1/0272* (2013.01); *G05D 1/0278* (2013.01); *G05D 2201/0202* (2013.01)
USPC .............................................. 701/50; 701/23

(58) Field of Classification Search
USPC ....... 701/50; 348/143; 702/174; 37/195, 465, 37/466, 448, 414
See application file for complete search history.

(56) References Cited

U.S. PATENT DOCUMENTS

| | | | |
|---|---|---|---|
| 5,548,516 A | 8/1996 | Gudat et al. | |
| 6,108,949 A * | 8/2000 | Singh et al. | 37/414 |
| 6,223,110 B1 | 4/2001 | Rowe et al. | |
| 6,363,632 B1 | 4/2002 | Stentz et al. | |
| 7,499,804 B2 | 3/2009 | Svendsen et al. | |
| 7,516,563 B2 | 4/2009 | Koch | |
| 7,753,132 B2 * | 7/2010 | Stanek et al. | 172/2 |
| 2004/0158355 A1 | 8/2004 | Holmqvist et al. | |
| 2005/0004735 A1 | 1/2005 | Kelly et al. | |
| 2005/0065689 A1 | 3/2005 | Budde et al. | |
| 2008/0082238 A1 | 4/2008 | Mannepalli | |

(Continued)

*Primary Examiner* — Marthe Marc-Coleman
(74) *Attorney, Agent, or Firm* — Oliff PLC

(57) ABSTRACT

A method and system for autonomous operation of an earth moving machine (EMM), configured for shoving matter, the EMM comprising at least one implement. Based on at least the mission objective and the mapping data of the mission area, the mission area is divided into segments, each segment being associated with a disposal point. An implement trajectory is calculated in respect of each of the segments such that matter is accumulated by the at least one implement along the segment as the EMM progresses and the accumulated matter is disposed upon arrival at the disposal point, without exhausting the EMM shoving capabilities.

34 Claims, 7 Drawing Sheets

(56) References Cited

U.S. PATENT DOCUMENTS

2008/0133128 A1 6/2008 Koch
2008/0147253 A1 6/2008 Breed
2008/0195269 A1 8/2008 Lacy et al.
2009/0299582 A1 12/2009 Anderson

* cited by examiner

SYSTEM AND METHOD OF AUTONOMOUS OPERATION OF MULTI-TASKING EARTH MOVING MACHINERY

FIELD OF THE INVENTION

This invention relates to the field of Unmanned Ground Vehicles (UGV) and more specifically to a UGV with earth moving capabilities.

BACKGROUND OF THE INVENTION

Earth moving machinery, such as excavators, shovel loaders, bulldozers, etc., has widespread use all over the world for performing a variety of missions. One example is large scale living neighborhood construction in which extensive ground preparation work is required. In such a mission, there is a need to operate one or more earth moving machines (hereinafter: "EMM") for this purpose. Usually, the EMMs are humanly operated. A human operator drives the EMM to the construction site, and then controls and operates the EMM within the construction site until completion of the desired mission.

Such a mission, as well as other missions, may be long, routine, tedious and time consuming, preventing a human operator from maintaining a high level of performance and operation of an EMM. As a result, a mission's quality of performance may not be optimal. Furthermore, a human operator is unable to continuously operate earth moving machinery for long periods of time.

In addition, a human operator cannot calculate the optimal operation conditions of an EMM, and cannot operate the EMM in such optimal conditions throughout the entire mission. Such optimal operation depends on many parameters that a human operator is unable to process during operation of an EMM. An important disadvantage resulting from the inability to operate an EMM under optimal conditions is the reduction of earth moving machinery reliability and survivability and increasing the machinery's life cycle costs. Furthermore, the usage of a human operator itself has its costs, as an operator must be trained, paid for his work, etc. In many cases, missions may require prior mapping and staking of the mission area, which in itself is a time consuming task.

Other missions may be designed to be carried out, for example, in dangerous areas, noxious areas or in low visibility conditions. Thus, some missions may be very hazardous or even impossible for a human operator.

There is thus a need in the art to provide a system and method for autonomous operation of earth moving machinery.

Prior art references considered to be relevant as a background to the invention are listed below. Acknowledgement of the references herein is not to be inferred as meaning that these are in any way relevant to the patentability of the invention disclosed herein.

U.S. Pat. No. 6,223,110 (Rowe et al.) issued Apr. 24, 2001, discloses a modular architecture to organize and coordinate components that are needed to automate earthmoving tasks, and to coordinate the flow of data between the components. The architecture includes three main subdivisions: a sensor pipeline, sensor data consumers, and motion planners and executors. The sensor pipeline receives raw sensor data from perceptual sensors such as a laser rangefinder or radar system, and converts the data into a form which is usable by the other system components. Sensor data can also be represented in the form of an elevation map of the surrounding terrain for other software components to use. Any number and types of sensor systems may be added to the software architecture depending on requirements and the capabilities of the system. The sensor data consumers use the sensor data as input to specific algorithms to produce information regarding the machine's environment for use by other system components. A motion planner receives information provided by the sensor data consumers, and delivers output commands to controllers on the machine. The motion planner also computes and delivers commands to the sensor systems on the machine. Additional planners may be added at this level to coordinate other system behaviors and actions.

U.S. Pat. No. 6,363,632 (Stentz et al.) issued Apr. 2, 2002 discloses a system to organize and coordinate components associated with earthmoving machinery capable of performing excavating and loading tasks autonomously. The system comprises an earthmoving machine equipped with a scanning sensor system operable to provide data regarding regions within an earthmoving environment including an excavation region and a loading region and a planning and control module operable to receive data from the scanning sensor system to plan a task associated with the control of the earthmoving machine while concurrently performing another task associated with control of the earthmoving machine. Any number and type of sensor systems, such as a laser rangefinder or a radar rangefinder, may be incorporated in the system depending on requirements and the capabilities of the system. The sensor systems have independently controllable fields of view, with each sensor system being capable of providing data pertaining to a different portion of the earthmoving environment.

U.S. Pat. No. 7,516,563 (Koch) issued Apr. 14, 2009 discloses a control system for a machine operating at an excavation site. The control system may have a positioning device configured to determine a position of the machine, and a controller in communication with the positioning device. The controller may be configured to receive information regarding a predetermined task for the machine, receive the machine's position, and receive a location of an obstacle at the excavation site. The control system may also be configured to recommend placement of the machine to accomplish the predetermined task based on the received machine position and obstacle location.

U.S. Pat. No. 7,499,804 (Svendsen et al.) issued Mar. 3, 2009 discloses a system and method for multi-modal control of a vehicle. Actuators (e.g., linkages) manipulate input devices (e.g., articulation controls and drive controls, such as a throttle, brake, accelerator, throttle lever, steering gear, tie rods, or transmission shifter) to direct the operation of the vehicle. Behaviors that characterize the operational mode of the vehicle are associated with the actuators. After receipt of a mode select command that dictates the operational mode of the vehicle (e.g., manned operation, remote unmanned tele-operation, assisted remote tele-operation, and autonomous unmanned operation), the actuators manipulate the operator input devices, in accordance with the behaviors, to effect the desired operational mode.

US Patent application No. 2004/0158355 (Holmqvist et al.) published on Aug. 12, 2004 discloses intelligent systems and functions for autonomous load handling vehicles such as wheel-loaders operating within limited areas and industrial environments. The vehicle is provided with a laser-optic system for determining the vehicle's position in six degrees of freedom comprising x, y, z, heading, pitch and roll, in fixed to ground coordinates. This system is used for autonomous vehicle navigation and as reference for on board terrain mapping sensors and a dynamic terrain model. The admitted work area for autonomous vehicle operation is divided in loading, unloading and obstacle free zones, each with specific rules for the vehicle's behavior concerning mission planning, vehicle and implement movement and control, and obstacle detection and avoidance. The dynamic terrain model is employed for planning and analyzing paths, for detecting and avoiding obstacles, and for providing data for optimizing vehicle paths and the movements of its implements in loading and unloading operations.

The references cited in the background teach many principles of earth moving machines/systems/methods that are applicable to the present invention. Therefore the full contents of these publications are incorporated by reference herein for appropriate teachings of additional or alternative details, features and/or technical background.

SUMMARY OF THE INVENTION

According to a first aspect of the invention, there is provided a method of autonomous operation of an earth moving machine (EMM) configured for shoving matter, the EMM comprising at least one implement, the method comprising:

receiving a mission objective; providing mapping data in respect of a mission area; determining a position of the EMM in respect of the mission area; determining, based on at least the mapping data and the mission objective, one or more segments within the mission area, wherein each segment is associated with a disposal point; in respect of each of the one or more segments, based on at least the mission objective, the mapping data, a length of the segment and shoving capability data of the EMM, calculating an implement trajectory of the at least one implement along the segment, thereby enabling accumulation of matter by the at least one implement along the segment as the EMM progresses and disposal of the accumulated matter upon arrival to the disposal point.

According to a second aspect of the invention, there is provided a system for autonomous operation of an EMM, the EMM comprising at least one implement, the system comprising:

a positioning utility, a detection and ranging facility and a mission computer;

the mission computer is configured to receive data in respect of a mission, the data includes at least a mission objective; the detection and ranging facility is configured to scan the mission area and obtain data in respect of the mission area; the positioning utility is configured to determine a position of the EMM in respect of the mission area; the mission computer is configured to: generate a map of the mission area based on the data; determine, based on at least the map and the mission objective, at least one segment within the mission area, wherein each segment is associated with a disposal point; and calculate, based on at least the mission objective, the map, a length of the at least one segment and shoving capability data of the EMM, an implement trajectory of the at least one implement along the segment, such that matter is accumulated by the at least one implement along the segment as the EMM progresses and upon arrival to the disposal point the accumulated matter is disposed.

According to a third aspect of the invention, there is provided a system for autonomous operation of an EMM, the EMM comprising at least one implement, the system comprising a mission computer configured to monitor at least one characteristic of the EMM as the EMM progresses and accumulates matter, and reposition the at least one implement in response to an indication that the at least one characteristic of the EMM exceeds a predefined threshold value.

According to a fourth aspect of the invention, there is provided a system for autonomous operation of an EMM, the EMM comprising at least one implement, the system comprising a mission computer configured to determine at least one segment associated with a disposal point and calculate an implement trajectory of the at least one implement along the at least one segment, such that matter is accumulated by the at least one implement along the at least one segment as the EMM progresses and upon arrival to the disposal point the accumulated matter is disposed.

BRIEF DESCRIPTION OF THE DRAWINGS

In order to understand the invention and to see how it may be carried out in practice, certain embodiments will now be described, by way of non-limiting examples only, with reference to the accompanying drawings, in which.

DETAILED DESCRIPTION OF EMBODIMENTS OF THE INVENTION

Figure 1:
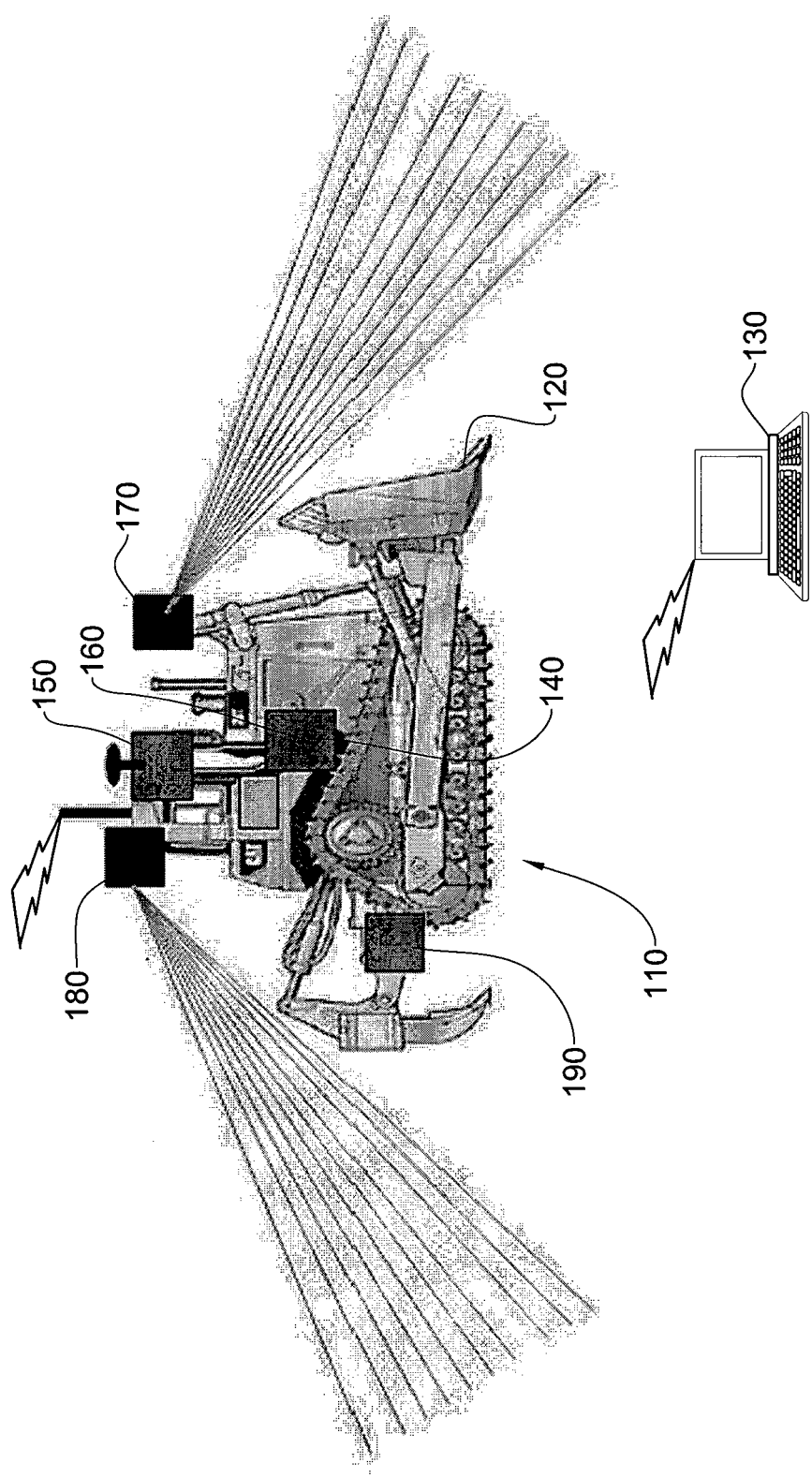
FIG. 1 is a schematic high level illustration of an EMM associated with a system for autonomous operation thereof, according to certain embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "receiving", "providing", "determining", "calculating", "monitoring", "utilizing", "positioning", "measuring", "storing" or the like, refer to the action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

In addition, embodiments of the present invention are not described with reference to any particular programming language. It will be appreciated that a variety of programming languages may be used to implement the teachings of the inventions as described herein.

As used herein, the phrase "for example," "such as" and variants thereof describe non-limiting embodiments of the present invention. Reference in the specification to "one embodiment", "an embodiment", "some embodiments", "another embodiment", "other embodiments", "certain embodiments" or variants thereof means that a particular feature, structure or characteristic described in connection with the embodiment(s) is included in at least one embodiment of the invention. Thus the appearance of the phrase "one embodiment", "an embodiment", "some embodiments", "another embodiment", "certain embodiments", "other embodiments" or variants thereof does not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Figure 2:
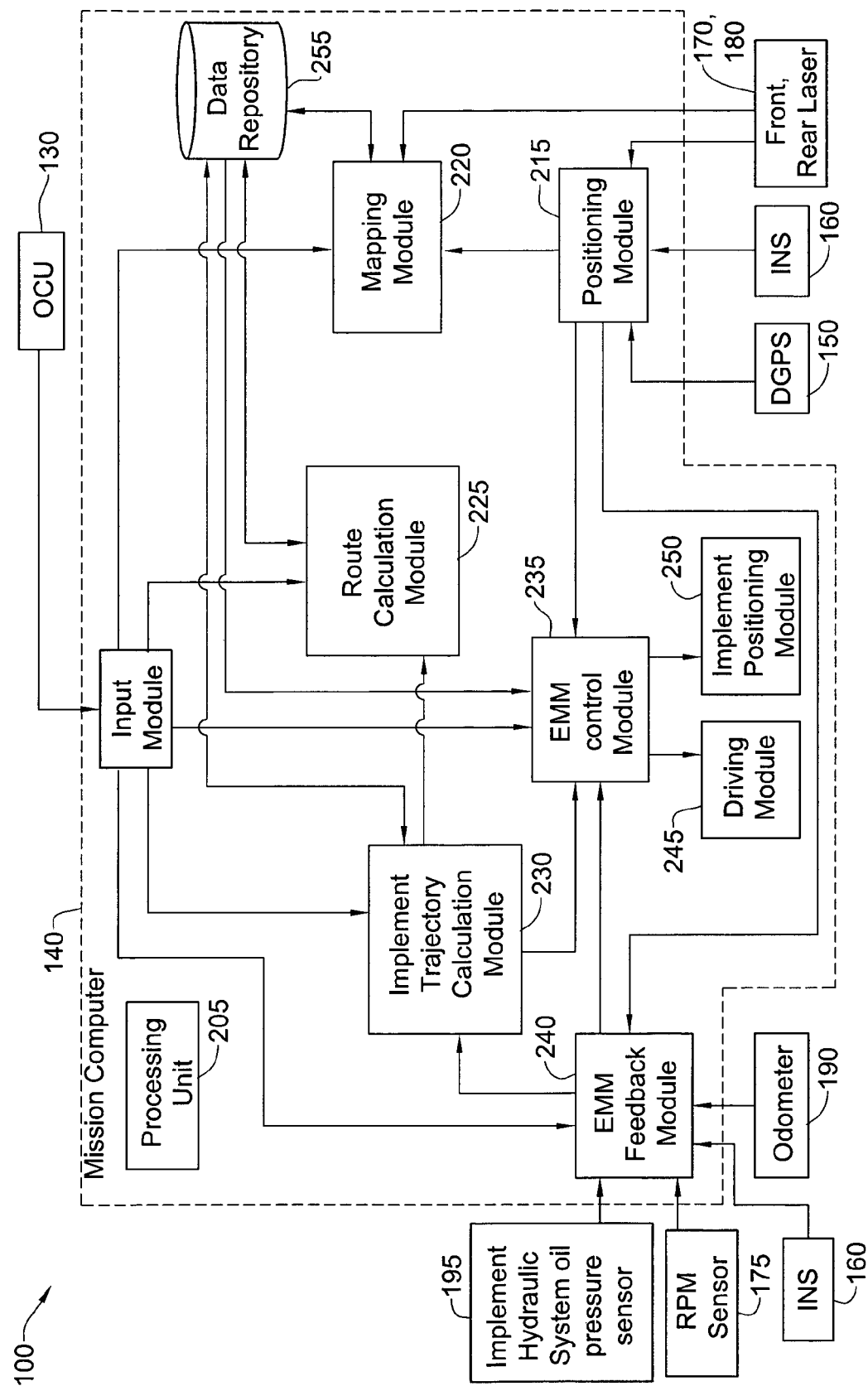
FIG. 2 is a block diagram schematically illustrating a system for autonomous operation of an earth moving machine, in accordance with certain embodiments of the invention.

In embodiments of the invention, fewer, more and/or different stages than those shown in FIGS. 3, 4, 5, 6 and 8 may be executed. In embodiments of the invention one or more stages illustrated in FIGS. 3, 4, 5, 6 and 8 may be executed in a different order and/or one or more groups of stages may be executed simultaneously. FIG. 2 illustrates a general schematic of the system architecture in accordance with an embodiment of the invention. Each module in FIG. 2 can be made up of any combination of software, hardware and/or firmware that performs the functions as defined and explained herein. The modules in FIG. 2 may be centralized in one location or dispersed over more than one location. In other embodiments of the invention, the system may comprise fewer, more, and/or different modules than those shown in FIG. 2.

Unless defined otherwise, all technical and scientific terms used herein have the same meaning as commonly understood by one of ordinary skill in the art to which this invention belongs. Generally (although not necessarily), the nomenclature used herein described below is well known and commonly employed in the art. Unless described otherwise, conventional methods are used, such as those provided in the art and various general references.

Turning to a detailed description of embodiments of the invention, FIG. 1 depicts a schematic high-level illustration of an EMM associated with a system for autonomous operation thereof, according to certain embodiments of the invention. EMM 110 associated with System 100 comprises at least one Implement 120 for earth moving, digging, shoveling and the like. Implement 120 may be a shovel, a scoop, etc. An EMM 110 according to the invention may be designed to use its engine power in order to push matter rather than to use the power of a piston or actuator for operating Implement 120 while EMM remains static during Implement 120 operation. One example of such EMM is a bulldozer.

System 100 further comprises an Operator Control Unit 130 (hereinafter: "OCU") configured for enabling interaction of a human operator with System 100 and monitoring of EMM 110 performance by a human operator. OCU 130 may be, for example, a personal computer, a portable computer or an apparatus with appropriate processing capabilities which may be, for example, specifically configured for that purpose. OCU 130 may include a display (e.g. LCD screen), and a keyboard or any other suitable input device. OCU 130 may be configured to receive a plurality of input parameters (e.g. from an operator or from another computer). The input parameters may include, for example, parameters defining a mission to be performed, such as the mission objective (e.g. desired height for ground leveling missions, desired depth and width for excavation missions, etc.), the mission area boundaries (e.g. geographical boundaries), terrain characteristics (e.g. weight, mass, density, size of particles etc. which, inter alia, define different materials such as sand, pebbles, soil, rocks, snow or any other matter), mechanical characteristics of EMM 110 and Implement 120 such as maximal shoving capabilities of EMM 110 (or parameters that enable calculation of such maximal shoving capabilities of EMM 110), as well as other parameters. In some embodiments the mission area boundaries are received as part of the mission objective.

OCU 130 may be located on-board EMM 110 or at a remote location. OCU 130 is further configured to communicate with EMM 110. The communication between EMM 110 and OCU 130 may be realized by any communication means, for example via wired or wireless communication. More specifically OCU 130 may be configured to communicate with a Mission Computer 140 located on-board EMM 110. Mission Computer 140 may be for example a computer based system, a microprocessor, a microcontroller or any other computing device which is adapted for data communicating and processing.

According to certain embodiments, System 100 further comprises a positioning utility. The positioning utility may be a Global Navigation Satellite System (GNSS), such as for example a Differential Global Positioning System (DGPS) 150. In some embodiments, the positioning utility further comprises an Inertial Navigation System (INS) 160. DGPS 150 and INS 160 are located on-board EMM 110 and configured to determine EMM 110 position, e.g. the geographical position in respect of the mission area. In other embodiments, the positioning utility may include, for example, at least one laser scanner, a radar scanner, or other detection and ranging means, which enables for example, to determine the position of EMM 110 in respect of one or more reference points located in the mission area or in the vicinity of the mission area.

According to certain embodiments Mission Computer 140 is associated with the positioning utility (e.g. DGPS 150 and INS 160 integrated system) and configured to receive EMM 110 positioning data therefrom. Mission Computer 140 is configured to utilize the data received from positioning utility (e.g. DGPS 150 and INS 160), for example, for navigating EMM 110 to a pre-defined mission area, navigating and operating EMM 110 within the mission area and for positioning Implement 120 as further described below.

According to certain embodiments, System 100 further comprises a detection and ranging facility, located on-board EMM 110, for scanning the mission area and obtaining mapping data therefrom (e.g. data relating to heights in various latitude and longitude coordinates). Mapping data is transmitted to Mission computer 140 and utilized for creating a map (e.g. a three-dimensional map) of the mission area. Detection and ranging facility may also be configured for updating a map of the mission area, where the map may be generated based on the data received from the detection and ranging facility or otherwise obtained from a different source. Detection and ranging facility may comprise, for example, at least one laser scanner, a radar system, an ultrasound scanner, etc. In certain embodiments, the detection and ranging facility may include at least two laser scanners, a Frontal Laser Scanner 170 configured to scan in front of EMM 110 and a Rear Laser Scanner 180 configured to scan areas to the rear of EMM 110, as further described below. Mission Computer 140 is associated with the detection and ranging facility via a wired or wireless communication means. According to certain embodiments, Mission Computer 140 is further configured to store the mapping data (and map) in a data-repository associated with Mission Computer 140.

According to certain embodiments, mission Computer 140 is further configured to utilize the data received from the laser scanners, in combination with the positioning data received from positioning utility (e.g. DGPS 150 and INS 160), for localizing EMM 110 in respect of the mission area (e.g. in respect of a three dimensional map of the mission area). According to other embodiments, System 100 may be configured to utilize pre-loaded mapping data and Mission Computer 140 may be configured to update the pre-loaded mapping data during mission performance by using the detection and ranging facility, and the positioning data.

In some embodiments, System 100 further comprises an Odometer 190 (e.g. mechanical odometer, electronic odometer or the like.), configured to monitor the distance traveled by EMM 110. System 100 may be configured to utilize the data received from Odometer 190 in combination with the data from the positioning utility for purposes of monitoring EMM 110 traction as further described below with reference to FIG. 2.

FIG. 2 is a block diagram schematically illustrating a system for autonomous operation of an earth moving machine, in accordance with certain embodiments of the invention. As described above, System 100 comprises an OCU 130 which enables interaction with System 100. OCU 130 is configured for example to communicate a plurality of input parameters, such as mission objective parameters. For example, where the mission objective is ground leveling, the parameters may include the desired ground height for the ground leveling mission in addition to the mechanical characteristics of EMM 110 and Implement 120, and the mission area boundaries. Where the mission objective is excavation, the parameters may include the desired shape (e.g. width and depth) of the excavation to be performed in addition to the mechanical characteristics of EMM 110 and Implement 120, and the mission area boundaries.

OCU 130 may be further utilized for monitoring EMM 110 and the progression of the mission performance, for example by displaying the mission performance progression to an operator on a display, displaying information regarding mechanical parameters or other characteristics of EMM 110 and displaying the location of EMM 110 in respect of the mission area. System 100 further comprises a Mission Computer 140. Mission Computer 140 comprises at least one Processing Unit 205 which is configured to manage, control and execute relevant mission computer 140 components and operations.

According to certain embodiments, system 100 comprises an input module 210 for receiving the input parameters from OCU 130. According to certain embodiments, System 100 further comprises Positioning Module 215, Mapping Module 220, Route Calculation Module 225, Implement trajectory calculation module 230, EMM Control Module 235 and EMM Feedback Module 240.

According to certain embodiments, Positioning Module 215 is configured to receive data indicative of the position of EMM 110 from a positioning utility, such as for example a DGPS 150, INS 160 or an integrated GNSS and INS navigation system.

EMM Control Module 235 is configured to drive and steer EMM 110 and to position Implement 120 in respect of the surface of the mission area. In certain embodiments, EMM Control Module 235 is configured to receive input from Input Module 210 including at least the location of the mission area and positioning data from Positioning Module 215. According to the received data EMM Control Module 235 operates a Driving Module 245 which is configured for driving and steering EMM 110 to the mission area boundary while utilizing the positioning data and optionally data acquired from the detection and ranging facility or other mapping data (e.g. pre-loaded mapping data) for that purpose, as further described below.

According to certain embodiments, Mapping Module 220 is configured to receive input data which defines the mission area boundaries from Input Module 210 and positioning data from Positioning Module 215 in order to locate the mission area and determine the position of EMM 110 in respect of the mission area. Mapping Module 220 is further configured to receive mapping data from the detection and ranging facility, (e.g. Frontal Laser Scanner 170 and Rear Laser Scanner 180) which is configured to scan the surface of the mission area (as defined by the mission area boundaries) and utilize this data in order to create a map of the scanned mission area. Mapping Module 220 is further configured to store the mapping data or map in Data Repository 255.

It should be appreciated that as the orientation of EMM 110 and of the detection and ranging facility onboard EMM 110 constantly changes, there is a need to bring the data received from positioning utility and the data received from scanning and ranging facility into a common coordinate reference. Various methods and techniques may be used for this purpose. Data in respect of the EMM 110 orientation, which may be received for example from INS 160, can be used to compensate for any deviations in the data received during the scanning process, resulting from the changing orientation of EMM 110 and of the detection and ranging facility.

According to certain embodiments, a Route Calculation Module 225 is configured to receive input parameters from Input Module 210 and mapping data from Data Repository 255. Based on the input parameters and all or part of the mapping data, Route Calculation Module 225 is further configured to calculate a mission execution route (hereinafter also referred to as: "route"), defining the progression of EMM 110 throughout the mission area while performing the mission. A mission execution route may comprise a combination of one or more calculated segments as further explained below.

The input parameters may include for example the mission area boundaries and the mission objective such as a desired height for a ground leveling mission or shape (e.g. width and depth) of a desired excavation mission. Alternatively, the input parameters may include the mission area boundaries and a parameter, indicating that the mission objective is a ground leveling mission in which the desired height is a calculated average of the different heights of the entire mission area. In the latter example, Route Calculation Module 225 may be configured to calculate the average height using all or part of the mapping data in respect of the mission area, stored in Data Repository 255. Input parameters may possibly include additional data such as EMM 110 mechanical characteristics and at least one terrain characteristic (e.g. weight, mass, density, etc.).

According to certain embodiments, Rout calculation Module 225 is configured to calculate an execution route by first determining one or more segments of the working area such that each segment is associated with a disposal point for disposing accumulated matter (e.g. sand, pebbles, soil, rocks, snow etc.). Such a disposal point may be located for example outside the mission area, or at a low ground area that needs to be filled with matter. The execution route represents the combination and ordering of these segments. The principles and logic for determining the division of the work area into segments are further described in more detail below with reference to FIG. 4 and FIG. 8. Data in respect of the calculated route and segments may be stored in a Data Repository 255 for further reference and update.

According to certain embodiments, mission computer 140 further comprises an Implement trajectory Calculation Module 230, configured to calculate a succession of estimated positions and orientations of Implement 120 in respect of the surface of the mission area along the route or along each segment (hereinafter: implement trajectory).

According to one embodiment, each estimated position and orientation of Implement 120 is associated with and defined by a corresponding actual position (e.g. longitude and latitude coordinates) in respect of the mission execution route or segment, defining where, along a route or a segment, a repositioning of Implement 120 is required. According to another embodiment, each estimated position is associated with and defined by a corresponding timing, (for example in respect of the mission starting time), defining when, during the work on a route or a segment, a repositioning of Implement 120 is required.

As EMM 110 progresses and shoves matter along a segment, the amount of accumulated matter increases, thus increasing the load on EMM 110 and decreasing the remaining EMM 110 engine power. According to certain embodiments, Implement trajectory Calculation Module 230 is configured to calculate an implement trajectory such that matter is shoved along a segment while the accumulating load on EMM 110 does not reach the maximal shoving capabilities of EMM 110 before reaching a predetermined disposal point. In order to avoid a power stall of EMM 110, and to efficiently perform the mission, the calculation of the implement trajectory is made according to a prediction of EMM 110 loads which are to be accumulated along a given segment and the forces that develop on EMM 110 as a result of the interaction of EMM 110 and Implement 120 with the shoved matter (e.g. soil) while working on that segment. In some embodiments, the disposal point may be located at the end of each segment, while in other embodiments the disposal point may be located in another place along the segment, for example at a predetermined distance from the end of the segment.

According to some embodiments, instead of determining fixed disposal points at known locations, the location of the disposal points may by determined during the progression of the work according to the accumulating load on the EMM. According to one embodiment, Implement trajectory Calculation Module 230 may for example be configured to calculate an implement trajectory which allows EMM 110 to shove matter for a predefined distance before reaching the maximal capabilities of EMM 110. Once the predetermined distance is covered, EMM 110 disposes of the shoved matter at an arbitrary disposal point, e.g. outside of the mission area boundaries. According to another embodiment, Implement Position Calculation Module 230 may for example be configured to calculate an implement trajectory which allows EMM 110 to shove a predefined amount or mass of matter which is less or equal to the maximal shoving capabilities of EMM 110. Once the predetermined mass is accumulated, EMM 110 disposes of the shoved matter at an arbitrary disposal point, e.g. outside of the mission area boundaries. More details with regard to the calculation of the implement trajectory are provided below with reference to FIG. 5.

According to certain embodiments, EMM Control Module 235 is configured to calculate operative actions necessary for maneuvering EMM 110 within a working area according to the calculated mission execution route and for positioning the implement along a segment according to the calculated implement trajectory. EMM Control Module 235 may be further associated with a Driving Module 245 and an Implement Positioning Module 250. Driving Module 245 is configured to receive steering instructions from EMM Control Module 235 and control the steering of EMM 110. Implement Positioning Module 250 is configured to receive positioning instructions from EMM Control Module 235 and control the position of Implement 120 for example, according to the calculated implement trajectory.

Unexpected constraints and changes during the work of EMM 110 may influence the development of the loads exerted on EMM 110, and therefore the predicted load accumulation which was calculated by Implement trajectory Calculation Module 230 may differ from the actual load accumulation. Thus, it is needed to monitor the actual load on EMM throughout the performance of the work, and update the mission planning accordingly.

Therefore, according to certain embodiments, mission computer 140 is further configured to monitor at least one characteristic of EMM 110. The monitored characteristic can be, for example, a mechanical parameter of EMM 110 (e.g. engine power or engine RPM) or traction. These EMM characteristics are indicative, inter alia, of the load exerted on EMM 110 and of its performance. To this end, System 100 further comprises an EMM Feedback Module 240, for monitoring EMM 110 characteristics. For example, EMM Feedback Module 240 may be configured to monitor a mechanical parameter such as engine power. For example, EMM Feedback Module 240 can be connected to an RPM sensor 175 in order to monitor the current RPM.

According to certain embodiments, in response to such indication, EMM Control Module 235 may be configured to instruct Implement Positioning Module 250 to reposition Implement 120. Such repositioning of Implement 120 (e.g. raising Implement 120) can result in a reduction of the load on EMM 110. Following such repositioning of Implement 120, EMM Control Module 235 is further configured to communicate an indication to Implement Trajectory Calculation Module 230 which is configured to recalculate an implement trajectory for Implement 120, for example, along the remaining part of the segment. According to certain embodiments as a result of the recalculation of implement trajectory, the disposal point may be moved from its previous location to a new location.

Implement Position Calculation Module 230 is further configured to store the recalculated implement trajectory in Data Repository 255. According to certain embodiments, in case a recalculation of implement trajectory of Implement 120 along a segment is performed, a subsequent EMM 110 mission execution route recalculation is performed by Route Calculation Module 225 and the mission execution route is adapted to the current conditions within the mission area and the recalculated implement trajectory. For example, in case the work on part of the mission area is completed, a new mission execution route is calculated for performing the work on the remaining parts of the mission area.

According to certain embodiments, EMM Feedback Module 240 is further configured to monitor EMM 110 traction. Reduction of traction may indicate that the grip of the tracks in the ground is insufficient for providing resistance to the engine power exerted on the ground while shoving matter along a segment. For this purpose, EMM Feedback Module 240 may utilize data received from Odometer 190 in combination with positioning data from Positioning Module 215. Situations of reduction of traction may be identified where a difference which is greater than a predefined threshold value is found between the traveled distance calculated by Odometer 190 and the traveled distance which is calculated by the positioning data (e.g. by using data from INS 160 and/or DGPS 150, etc.). In some implementations, the threshold is calculated as a function of the driving speed of EMM 110. For example, the threshold can be defined as any distance which is greater than 1 percent of the distance which is traveled in one hour of driving at the current speed of EMM 110 (e.g. if the speed is 20 miles per hour—a distance of more than 0.2 mile). A mismatch in the calculations may indicate that EMM 110 tracks traveled a longer distance than the actual distance the EMM traveled and thus indicate loss of traction. According to certain embodiments loss of traction indication is issued to EMM Control Module 235 and Implement Position Calculation Module 230. It should be noted that the above example for calculating reduction of traction is non-limiting and other known methods and techniques for identifying reduction of traction may be used as well.

Furthermore, according to certain embodiments, EMM Feedback Module 240 may also be configured to monitor the strain exerted on Implement 120. For example EMM Feedback Module 240 can be connected to an implement hydraulic system oil pressure sensor 195 configured for sensing the strain exerted on the hydraulic system of Implement 120. Similar to reduction of traction and to reduction of engine power, in case EMM Feedback Module 240 identifies that the pressure of the implement hydraulic system is below or above a predefined threshold value, an indication is issued to EMM Control Module 235 and Implement Position Calculation Module 230.

As described above with regard to reduction of engine power, in response to an indication of loss of traction or an indication of exceeded strain on the implement hydraulic system issued to the EMM Control Module 235, EMM Control Module 235 may be configured to instruct Implement Positioning Module 250 to reposition Implement 120 (e.g. raise Implement 120). Once such repositioning of Implement 120 is performed, Implement Trajectory Calculation Module 230 is configured to recalculate the trajectory of Implement 120. The Implement Trajectory Calculation Module 225 is further configured to store the recalculated implement trajectory in Data Repository 255. According to certain embodiments, in case Implement Trajectory Calculation Module 230 recalculates the trajectory of Implement 120, a corresponding mission execution route recalculation may be subsequently performed by Route Calculation Module 225.

Figure 3:
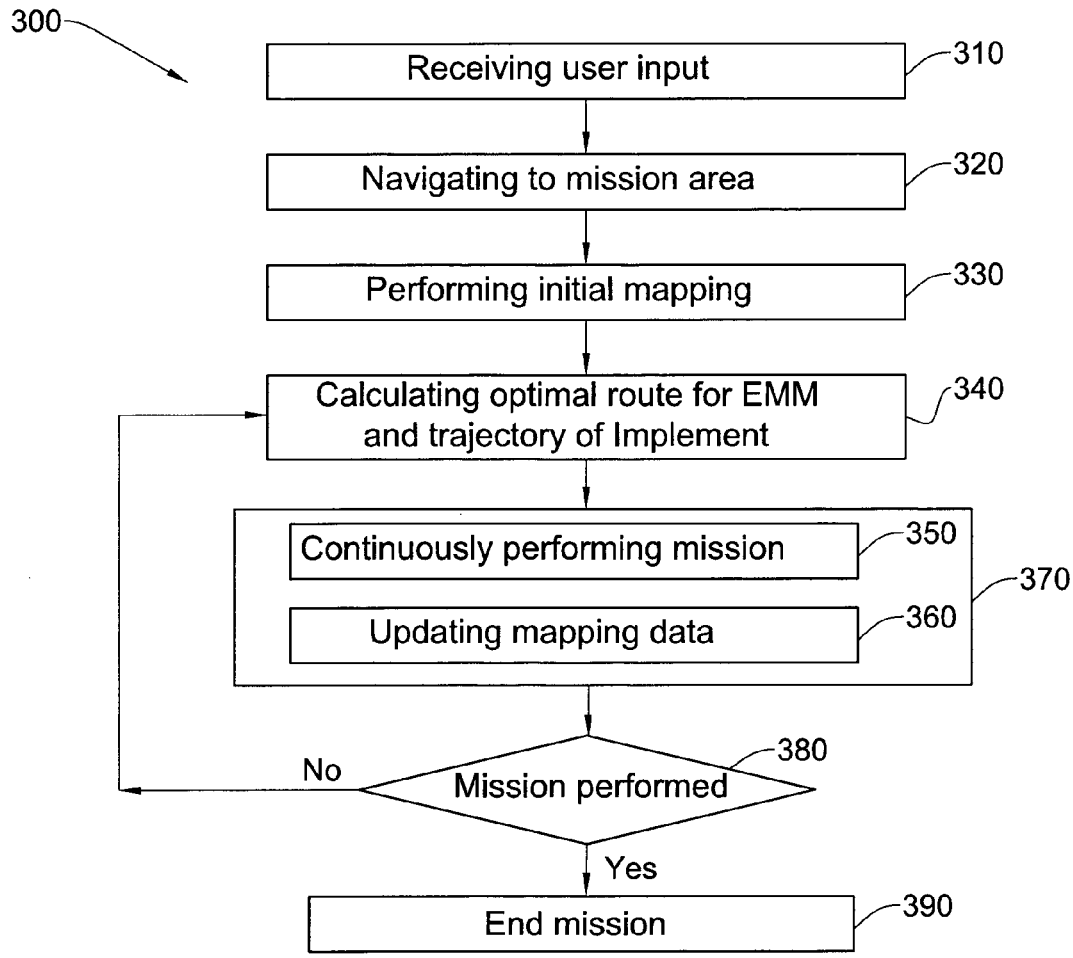
FIG. 3 is a flowchart illustrating a sequence of operations carried out for performing a mission, in accordance with certain embodiments of the invention.

FIG. 3 is a flowchart illustrating a sequence of operations carried out while performing a mission, in accordance with certain embodiments of the invention. In the first stage of process 300 input parameters are received by System 100 (Block 310). Input parameters may include, for example, the mission objective, the mission area location and/or boundaries, as well as other parameters. The parameters may vary according to different types of mission objectives, e.g. an excavation mission, a ground leveling mission, etc., as further exemplified above.

The mission area boundaries may be the geographical boundaries of the mission area represented for example by two geographical coordinates—e.g. one for the north-eastern corner of the mission area and the other for the south-western corner of the mission area, thus creating a rectangular mission area. Another example is receiving more than two points wherein the area confined by the received points is the mission area. As any person of ordinary skill in the art can appreciate, other representations of the mission area boundaries may be utilized as well. According to such embodiments, and in case that EMM 110 is not located within the mission area boundaries, System 100 may autonomously self-navigate to the mission area (Block 320), with no need of any human intervention or pre-loaded data such as mapping data. For purpose of navigating to the mission area, Mission computer 140 may utilize EMM 110 positioning data acquired by positioning utility, (e.g. DGPS 150 and/or INS 160). For example, mission computer 140 may calculate the heading to the mission area and seek to maintain the calculated heading. Mission computer 140 may further utilize EMM 110 detection and ranging facility, (e.g. Frontal Laser Scanner 170), for purpose of detecting obstacles along the way. In case such obstacles are detected, mission computer 140 is configured to lead EMM 110 and circumvent the obstacle and continue towards the calculated heading. It should be noted that in other embodiments, System 100 may utilize other methods for navigating to the mission area such as utilizing pre-loaded mapping data, following a predefined route, etc.

According to certain embodiments, once EMM 110 arrives at the mission area, System 100 is configured to autonomously perform an initial mapping of the mission area (Block 330). To this end, according to certain embodiments, mission computer guides EMM 110 along the mission area boundaries. The navigation along the mission area boundaries is performed with the aid of positioning data acquired by the positioning utility. System 100 further utilizes detection and ranging facility, for purpose of scanning inside the mission area for extracting mapping data therefrom. The extracted mapping data can be stored in Data Repository 255.

It should be noted that depending on the mission area topography and size, the initial mission area mapping may result in an incomplete and/or inaccurate map. However, such problems are solved by continuous updating of the map, which is performed throughout the mission performance, as further described below.

Utilizing the mapping data stored in Data Repository 255 and the input parameters defining the mechanical characteristics of EMM 110 and Implement 120 (for example shoving capabilities, implement capacity, etc.) System 100 is further configured to calculate a mission execution route for EMM 110. According to certain embodiments, mission execution route comprises one or more segments and an implement trajectory of Implement 120 is determined along each segment (Block 340). A more detailed description of EMM 110 mission execution route and implement trajectory calculations is described below with reference to FIG. 4, FIG. 5 and FIG. 8.

System 100 is further configured to utilize EMM 110 positioning data acquired by the positioning utility to maneuver EMM 110 along the calculated EMM 110 mission execution route and perform the mission, while the calculated implement trajectory is utilized for positioning Implement 120 along the execution route (Block 350).

During the time the mission is being executed, System 100 further utilizes EMM 110 detection and ranging facility, (e.g. Frontal Laser Scanner 170 and Rear Laser Scanner 180), for continuously obtaining mapping data and updating the mapping data which is stored in Data Repository 255 (Block 360) accordingly. Frontal Laser Scanner 170 is configured to scan in front of EMM 110 for obtaining mapping data of mission area about to be covered and Rear Laser Scanner 180 is configured to scan backwards from EMM 110 for obtaining mapping data regarding the mission area covered by EMM 110 for example for monitoring terrain changes resulting from the work performed within the mission area. According to certain embodiments, both processes described with reference to Block 370 are performed continuously and simultaneously during performance of the mission.

Following the updating process of the mapping data, System 100 is further configured to analyze the mapping data stored in Data Repository 255, in order to monitor the progression of the mission until its completion (Block 380). According to certain embodiments, the desired result, as defined by the mission objective, is compared to the current mapping data of the mission area in order to determine whether the mission has been completed, and what are the remaining tasks. The task described with reference to Block 380 can be performed by mapping module 220.

According to certain embodiments, system 100 may be configured to continuously monitor the work which is performed on each segment. Once the work on a certain segment has been performed, System 100 may be configured to check based on the updated stored mapping data, whether the mission objective has been accomplished, for example, whether a desired altitude of the ground of the mission area, has been obtained. If parts or the entire segment did not reach the predefined desired altitude—an indication that more work should be performed on the segment is issued and saved in Data Repository 255 with reference to the segment. System 100 then continues to the next segment according to the mission execution route stored in Data Repository 255.

When the altitude of the terrain of a segment reaches the predefined desired altitude (as defined by the mission objective), System 100 is further configured to check whether other segments in the mission area require additional work. If other segments which require additional work exist, the process turns to Block 340 where an implement trajectory is calculated for the segments that require additional work, while utilizing the up-to-date mapping data stored in Data Repository 255. The process continues to follow the operations in Block 370 and 380 until completion of the mission. When no further segments that require additional work exist, the mission comes to an end (Block 390). It should be noted that the process described with reference to FIG. 3 is merely a non-binding example and other methods for performing and processing the mission objective may be implemented as well.

Figure 4:
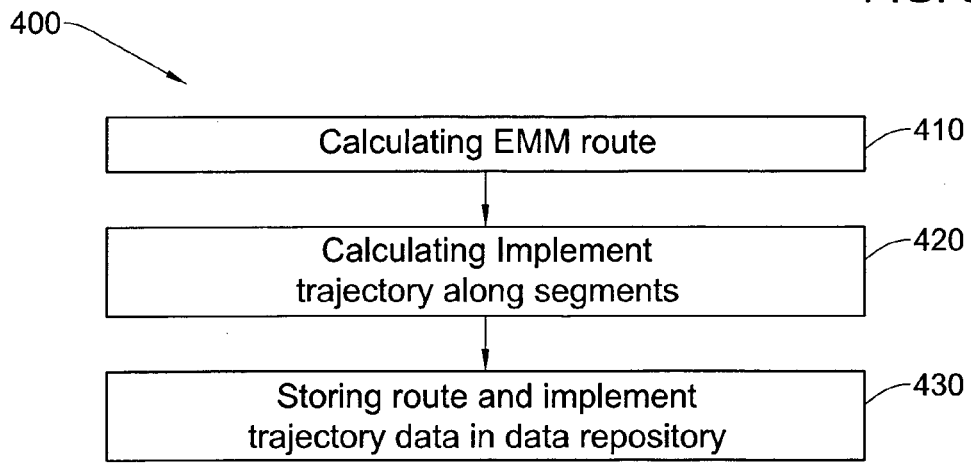
FIG. 4 is a flowchart illustrating a sequence of operations carried out in a mission execution route calculation process, in accordance with certain embodiments of the invention.

FIG. 4 is a flowchart illustrating a sequence of operations carried out in a mission execution route calculation process, in accordance with certain embodiments of the invention. FIG. 4 is a more detailed example of the process described above with reference to Block 340 in FIG. 3. According to certain embodiments, the mission execution route, comprised of one or more segments, and the implement trajectory along each of the one or more segments is calculated for the entire mission area. According to other embodiments, EMM 110 mission execution route, comprised of one or more segments and the implement trajectory along each of the one or more segments is calculated to different parts of the mission area separately. For example, the route may be gradually constructed segment by segment according to the progression of the mission. Accordingly, a first segment is calculated and only after the work on that segment is completed another segment is calculated and so on, until the completion of the mission.

In Block 410 mission execution route is calculated. According to certain embodiments, the execution route is calculated such that minimal maneuvering of EMM 110 and minimal repetition of work on the same segment(s) is required. In general, mission execution route is calculated to obtain a complete and systematic coverage of the mission area. As explained above, in certain embodiments the mission execution route is comprised of one or more segments. A systematic coverage therefore means that EMM 110 follows a pattern while moving from one segment to another and does not perform the mission in a sporadic manner, thus working efficiently. Movement of EMM 110 may be performed in long segments. Continuous movement of EMM 110 in long segments enables better utilization of its resources and requires less maneuvering of the EMM 110 in order to dispose of the accumulated matter and is therefore efficient in general. In addition, the calculation of the one or more segments comprising the mission execution route is performed such that a minimal amount of repetitions of segments is performed, thus, for example, minimizing the maneuvering of EMM 110.

Depending on the type of the mission, different principles are used for calculation of the execution route. For example, in ground leveling missions a mission execution route may be calculated so that EMM 110 movement is from high grounds to low grounds (since in a ground leveling mission, matter may be moved from the high grounds to the low grounds or outside of the mission area boundaries).

For the purpose of mission execution route calculation, System 100 may utilize the input parameters, the mission objective and the mission area boundaries, EMM 110 and Implement 120 mechanical limitations, including EMM 110 shoving capabilities, etc., as well as the mapping data stored in Data Repository 255.

Furthermore, during the calculation of the segments, the location of the disposal points may also be considered. Accordingly, the mission execution route may be comprised of one or more segments such that each segment is associated with a disposal point, e.g. each segment ends at a disposal point. Disposal points may be located for example outside of the mission area, or, for example in a ground leveling mission, at low grounds that should be filled with matter excess from higher grounds in the working area.

Figure 8:
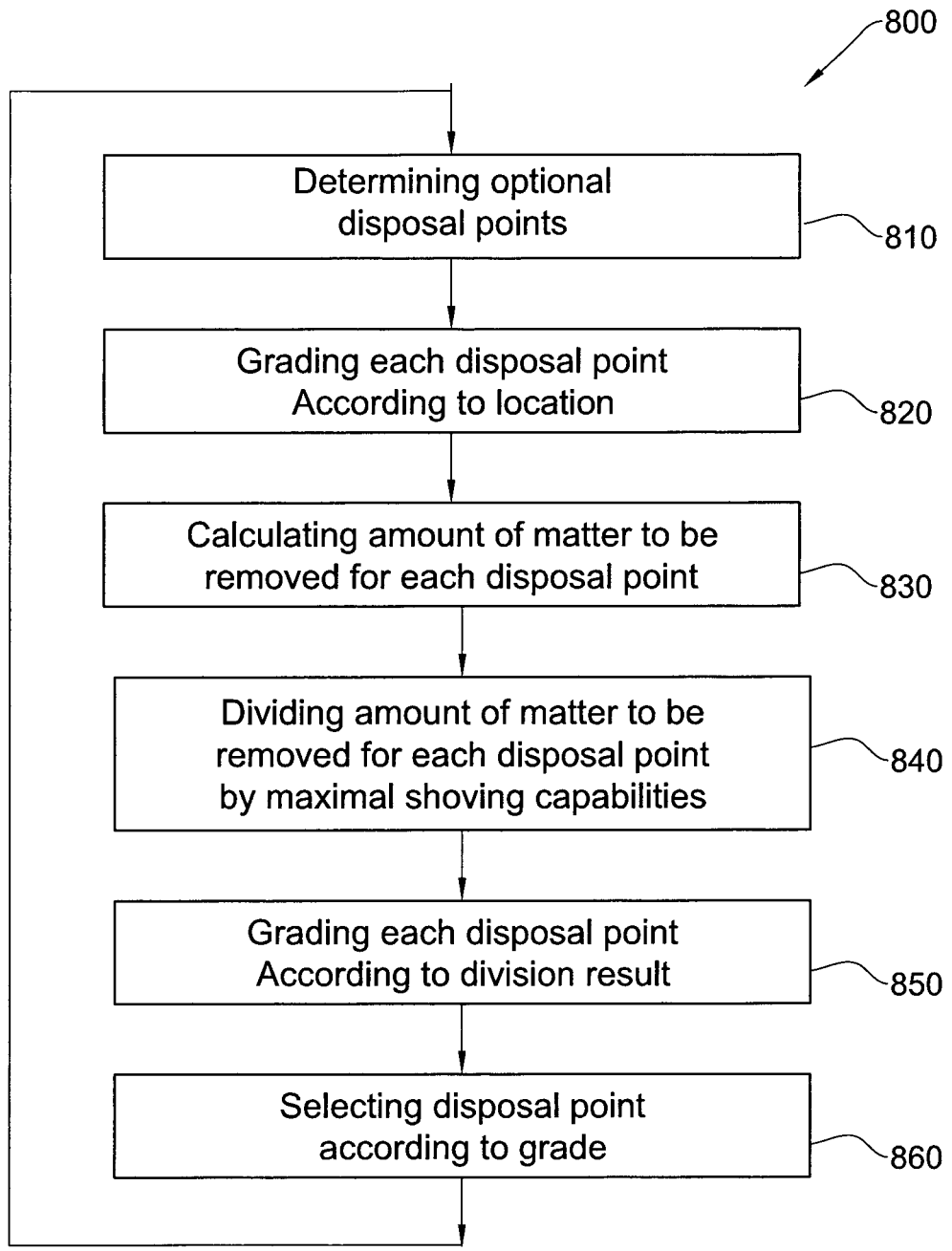

Turning to FIG. 8, it shows a flowchart illustrating an example of a calculation process of a mission execution route, in accordance with certain embodiments of the invention. Mission Computer 140 can be configured to utilize mapping data stored in Data Repository 255 in order to determine at least one optional disposal point. For example, in a ground leveling mission, the optional disposal points can be located at low grounds or outside the mission area, etc. In some implementations, such optional disposal points can be calculated in an area within a certain range (for example a predefined range of 20 meters) from a reference point. The reference point can be for example, EMM 110 current position (e.g. EMM position at the beginning of the mission, EMM position at the end of a segment, etc.), EMM 110 predicted position along mission execution route, a predetermined location, etc (Block 810). In other implementations, System 100 may be configured to calculate optional disposal points within the entire mission area. The calculated optional disposal point can be stored in Data Repository 255 before commencing performance of the mission. Alternatively or additionally, System 100 can be configured to utilize predetermined optional disposal points, determined for example by a human operator and stored in Data Repository 255.

System 100 can be configured to utilize optional disposal points, for calculating a route comprising one or more segments. System 100 can be configured to grade each optional disposal point, inter alia according to its location (Block 820). For example, optional disposal points can be graded in a ground leveling mission based on their location in respect of the mission area boundaries. The grade of an optional disposal point which is located in an area that needs to be filled with matter, —is raised by 1, whereas the grade of an optional disposal point which is located outside the mission area boundaries, its grade will be raised by 3 (note that in this example a minimal grade is preferred). System 100 can be further configured to utilize mapping data stored in Data Repository 255 in order to calculate for each optional disposal point the amount of matter to be removed from the segment starting from the reference point and ending at the optional disposal point (Block 830), and divide the result by the maximal shoving capabilities of EMM 110 (Block 840). If the result of the division is smaller than 1, indicating that the entire work on the segment can be completed in one pass, the grade of the optional disposal point associated with the segment will be raised by 1, whereas if the result is bigger than 1, the grade will be raised by the result of the division (Block 850). It should be noted that the specific process of grading option disposal points described above is merely an example which should not be construed as binding or limiting in any way.

Following the grading process System 100 can be configured to compare the grades of the optional disposal points and select the disposal point with the lowest grade (Block 860). In case two or more optional disposal points have the same minimal grade System 100 can be configured to compare the length of the segments starting from the reference point and ending at the optional disposal points and select the disposal point having the longest segment associated therewith. In certain embodiments, following selection of a disposal point indicative of a segment, the process of calculating a segment is repeated while utilizing the selected disposal point as the new reference point.

Returning to FIG. 4, as detailed above, the mission execution route may be divided into segments, where in some embodiments each segment is associated with a matter disposal point for disposing matter accumulated along the segment. System 100 may be configured to calculate implement trajectory along the segments (Block 420). Such implement trajectory is calculated while utilizing data in respect of the mission objective, the mapping data or part thereof (the relevant part for the specific segment) and the shoving capabilities of EMM 110 for that purpose. Implement trajectories are calculated, in general, while considering the work of EMM 110 along the entire segment and the predicted mass of matter that will gradually accumulate along the segment. The calculated implement trajectory along each segment is stored in Data Repository 255 (Block 430).

Figure 5:
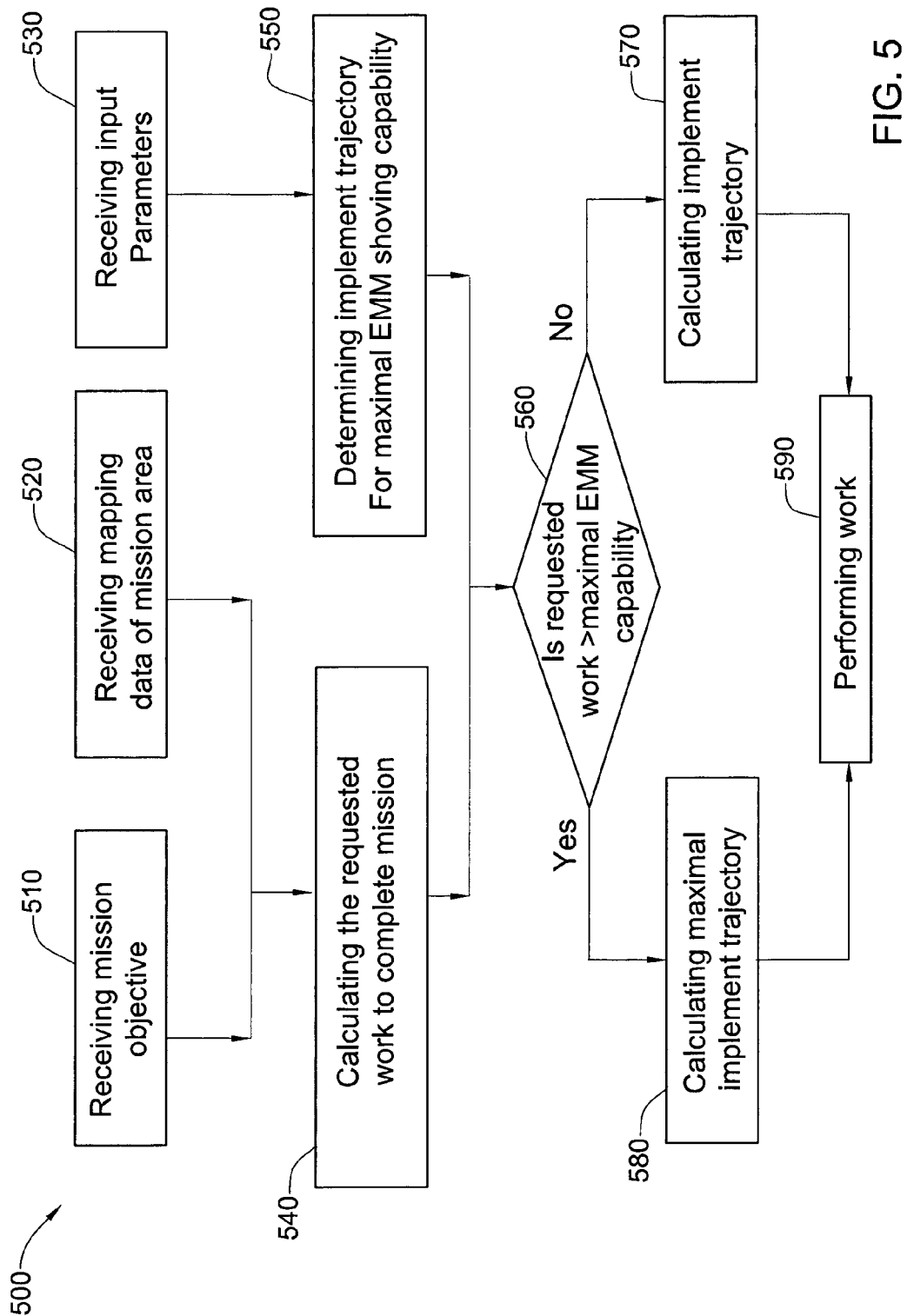
FIG. 5 is a flowchart illustrating an example of a sequence of operations carried out in the process of determining an implement trajectory, according to an embodiment of the invention.

FIG. 5 is a flowchart illustrating an example of a sequence of operations carried out in the process of determining an implement trajectory, according to an embodiment of the invention. FIG. 5 illustrates a more detailed example of the process described above in Block 340 and Block 370 with reference to FIG. 3 and Block 420 with reference to FIG. 4. As described above, as EMM 110 progresses and shoves matter along a segment, the accumulated matter increases, thus increasing the load exerted on EMM 110 and decreasing the remaining EMM 110 engine power. Mission computer 140 is configured to calculate an implement trajectory such that matter is shoved along each segment while the accumulating load on EMM 110 does not exceed the maximal shoving capabilities of EMM 110. The accumulating load on EMM 110 is a function, inter alia, of the driving distance from the beginning of a segment to the nearest disposal point (e.g. segment length), the terrain characteristics and the blade depth in the shoved matter (e.g. soil). Knowing the distance from the beginning of a segment to its associated disposal point, the current terrain topography and the maximal shoving capabilities of EMM 110 it is possible to calculate an implement trajectory (blade depths) such that matter is shoved along the entire segment without exhausting the shoving capabilities of EMM 110.

Depending on the mission objective and the actual topography of the mission area, a calculation of the amount of matter to be disposed from a given segment can be performed. Then, utilization of the maximal shoving capability of EMM 110 and the amount of matter to be disposed in order to obtain a desired mission objective enables a calculation of the implement trajectory.

Figure 7:
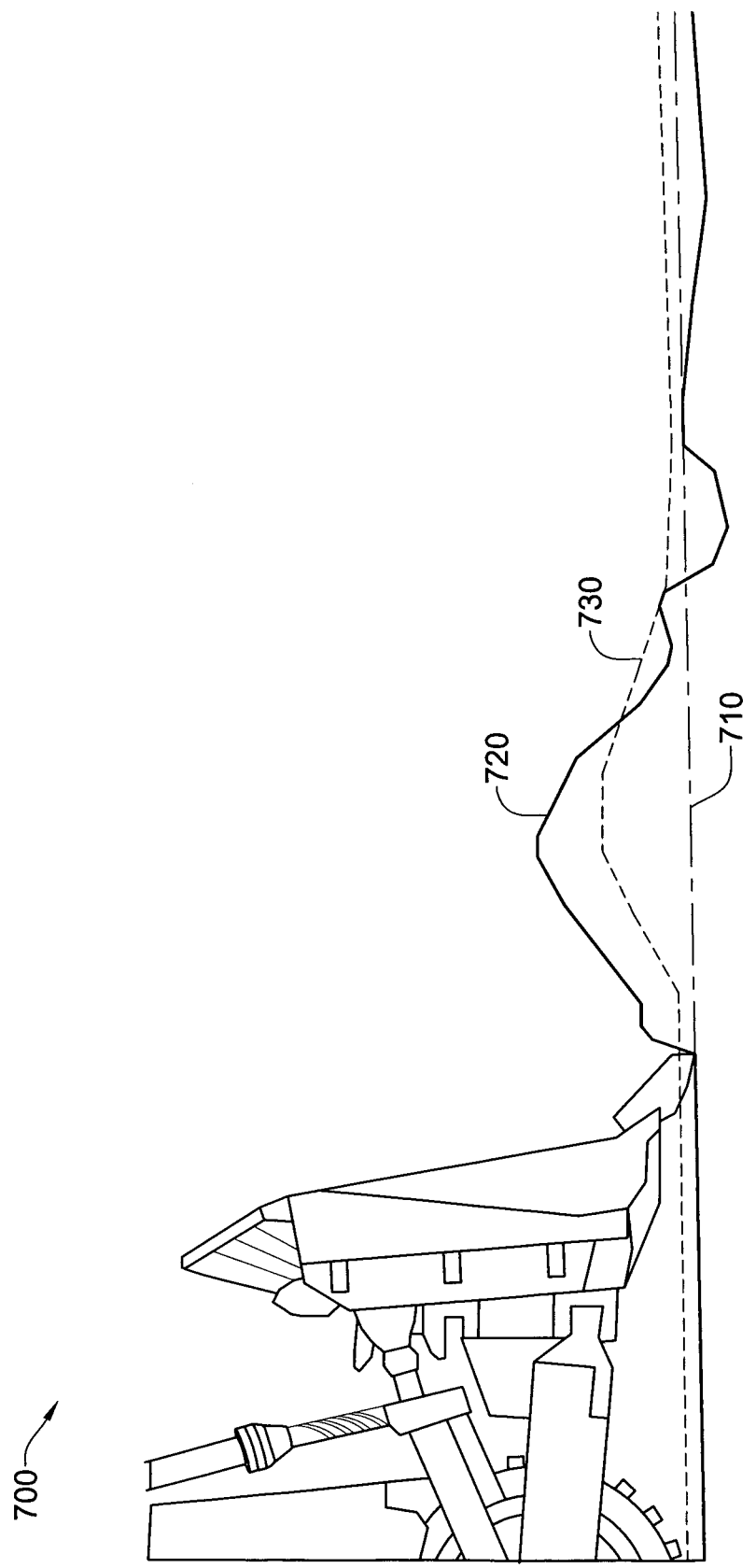
FIG. 7 is a schematic illustration and example of an implement trajectory, in accordance with certain embodiments of the invention; and, FIG. 8 is a flowchart illustrating an example of a route calculation process, in accordance with certain embodiments of the invention.

In this regard, FIG. 7 is a schematic illustration and example of an implement trajectory along a segment, in accordance with certain embodiments of the invention. As detailed above, FIG. 7 shows an example of a leveling mission where it is desired to level the surface according to a predefined altitude. FIG. 7 shows a segment in a mission area where broken line 720 illustrates the initial topography of the segment and broken line 710 illustrates the desired ground level. Line 720 illustrates the calculated implement trajectory for performing the required mission.

Returning to FIG. 5, According to certain embodiments, for a more accurate calculation of the implement trajectory a soil mechanics algorithm may be utilized for prediction of the accumulated load on EMM 110. A soil mechanics algorithm is utilized in order to calculate an estimation of the soil resistance based on typical parameters for common types of soil, for example, density, humidity, shear parameters, load factors, Bekker soil constants, etc. As a person of ordinary skill in the art can appreciate, better accuracy levels (e.g. of centimeters) may be achieved.

Before the onset of the work, mission computer 140 receives the mission objective which defines, inter alia, an objective to be accomplished (Block 510). For example, a mission objective can be to level the ground surface within the mission area according to a given altitude. Mission computer 140 also receives the mapping data of the mission area obtained by the positioning utility and the detection and ranging utility associated with mission computer 140 (Block 520). According to certain embodiments, for each segment, the desired mission area topography of the segment, as defined by the mission objective, is compared with the actual mission area topography, and the required work for obtaining the mission objective is determined (Block 540). Determination of the required work may be made, for example continuously or periodically, while working on a segment.

In order to determine the implement trajectory for maximal EMM shoving capability (Block 550) input parameters are received by mission computer 140. The received input parameters include, inter alia, the maximal EMM shoving capability, the segment's length and possibly parameters in respect of the terrain characteristics. Based on the received input parameters, mission computer 140 determines the implement trajectory for exploitation of the maximal shoving capability of EMM 110 within the segment (Block 550).

According to certain embodiments, in case the amount of matter that is required to be disposed from a given segment is less than the amount of matter according to the maximal shoving capabilities of EMM 110, the implement trajectory is calculated in order to shove the full amount of requested matter in a single pass over the segment (Block 570). In case the matter that is requested to be disposed is greater than the amount of matter according to the maximal shoving capabilities of EMM 110, the implement trajectory is calculated in order to dispose a maximal amount of matter which would not exceed EMM 110 maximal shoving capabilities (Block 580). Once the implement trajectory is calculated, work on the segment is performed (Block 590).

As explained above with reference to Block 360 in FIG. 3 the mission area is continuously scanned during performance of the mission (using, for example, a rear laser scanner) and the mission area map is updated as work on the segment progresses. The updated mapping data is stored in data repository 255. According to certain embodiments, work on the segment can be further repeated until the entire amount of matter is disposed and the mission objective is completed. According to certain embodiments, before each iteration on a segment, a new implement trajectory is calculated based on the updated mapping data. The system 100 may be configured such that while the work is being performed on a segment, the implement trajectory of a successive segment is calculated. This enables to maintain the continuity of the work, while moving from one segment to the next.

In case the remaining amount of matter in the last iteration on the segment is less than the amount of matter according to the maximal shoving capabilities of EMM 110, the implement trajectory is calculated in order to shove the full amount of requested matter in a single pass over the segment.

According to a certain embodiment, the process illustrated with reference to FIG. 5 is performed by Implement Position Calculation Module 230. In order to carry out this calculation, Implement Position Calculation Module 230 is configured to receive the calculated mission execution route data (including the position and length of each segment) from Route Calculation Module 225, all or part of the mapping data (for example the relevant mapping data for a specific segment) from the Data Repository 255 and input parameters from Input Module 210. According to certain embodiments, input parameters include, inter alia, mission objective, EMM 110 shoving capabilities, and terrain characteristics.

Figure 6:
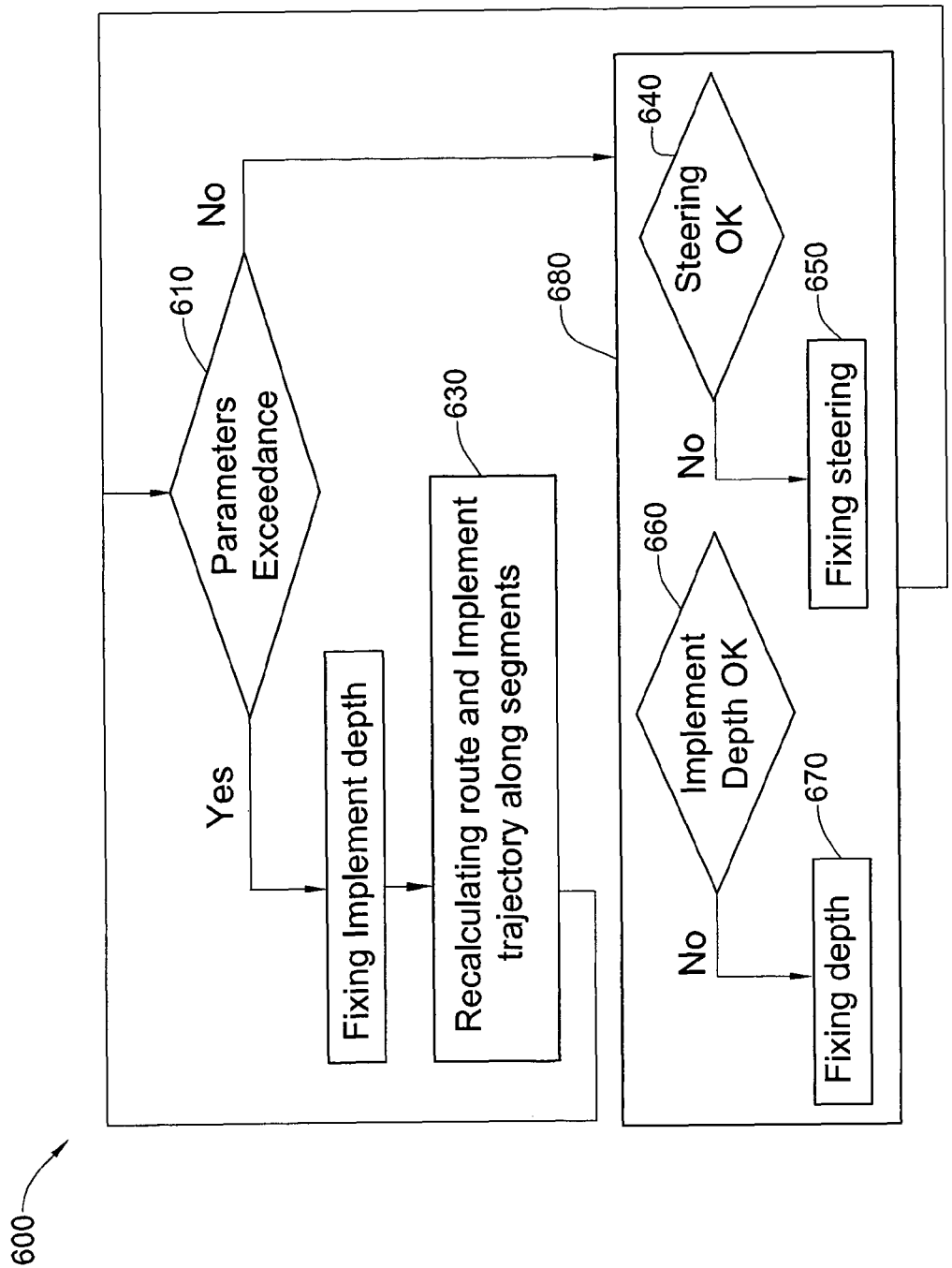
FIG. 6 is a flowchart illustrating a sequence of operations of a process for monitoring and controlling EMM 110 steering and implement 120 position, in accordance with certain embodiments of the invention.

FIG. 6 is a flowchart illustrating a sequence of operations of a process for monitoring and controlling EMM 110 steering and Implement 120 position, in accordance with certain embodiments of the invention. The operations described with reference to FIG. 6 are performed, for example, as part of Block 370 in FIG. 3 and Block 590 in FIG. 5. As detailed above, System 100 is configured to calculate a route for EMM 110 and a trajectory of Implement 120 along the route. In some embodiments, mission execution route is divided into segments. While performing the mission (Block 370) System 100 is configured to steer EMM 110 along the calculated route and monitor and control the position of Implement 120 in accordance with the calculated implemented trajectory.

As further explained above with reference to FIG. 2 System 100 is further configured to continuously monitor the performance of EMM 110, and if necessary reposition Implement 120. In some embodiments, a recalculation of the one or more segments comprising the mission execution route is subsequently performed.

As shown in the FIG. 6, System 100 is configured to monitor EMM 110 and Implement 120 performance (Block 610). To this end, System 100 monitors one or more EMM 110 parameters and characteristics which are indicative of the load on EMM 110 and its performance, for example, mechanical parameters of EMM 110 (e.g. engine power or engine RPM) or traction.

System 100 may be configured to calculate, for example, the remaining engine power (P) as a mechanical parameter of EMM 110. The reaming engine power may be calculated using the following equation:

$$P = \alpha * Me * n$$

Where:
P=the remaining engine power
α=constant physical coefficient [add explanation what this is!]
Me=the actual momentary engine torque
n=current RPM The momentary engine torque (Me) may be calculated by utilizing, for example, different parameters of the engine, such as the engine air sucking pressure, the engine air temperature, and the air supply to the engine. As any person of ordinary skill in the art can appreciate, the engine power and the momentary engine torque can be calculated using various methods and techniques.

A deterioration of EMM 110 engine power below a predefined threshold while EMM 110 is shoving matter may indicate that EMM 110 is reaching its maximal shoving capabilities. Thus, EMM Feedback Module 240 may send an appropriate indication to EMM Control Module 235 and to Implement Trajectory Calculation Module 230, in case for example, one or more of the following is determined by EMM feedback Module:

1. decrease in EMM 110 engine power below a predefined threshold, 2. decrease in EMM 110 engine RPM below a predefined threshold, or, 3. decrease in EMM 110 engine power below the predicted EMM 110 engine power. In some cases, the pre-defined thresholds can be set within a certain range from critical operation levels, thus providing a certain time frame for handling the threshold exeedance, without causing damage to EMM 110 and/or Implement 120.

In some cases, when System 100 determines that one or more of the monitored EMM 110 and/or Implement 120 parameters exceeds a predefined threshold value, System 100 is configured to reposition Implement 120 (e.g. reduce implement 120 ground penetration depth or raise Implement 120) in order to reduce the load on EMM 110 (Block 620). According to certain embodiments, in case Implement 120 positioning is altered and therefore deviates from the calculated implement trajectory, System 100 is configured to recalculate EMM 110 mission execution route comprising one or more segments and implement trajectory along the segments (Block 630).

In other cases, when System 100 determines that one or more of the monitored EMM 110 and/or Implement 120 parameters exceeds a predefined threshold value, System 100 is configured to firstly perform a recalculation of EMM 110 mission execution route comprising one or more segments and implement trajectory along the segments and after performing the recalculation and based on the newly calculated segment—reposition Implement 120 accordingly. Thus, for example, when a threshold is met, System 100 can be configured to recalculate the segment in order to dispose the accumulated matter in a closer disposal point (e.g. outside the mission area). In such cases System 100 can be configured to recalculate a new mission execution route comprising one or more segments and following the calculation a repositioning of the implement will be performed if required.

Following the repositioning of Implement 120, and recalculation of EMM 110 route and implement trajectory along the segments, System 100 returns to continuously monitor EMM 110 and Implement 120 performance (Block 610).

As can be further seen from FIG. 6, in case the monitored parameter does not exceed the predetermined thresholds, System 100 is further configured to simultaneously steer EMM 110 and control Implement 120 positioning (Block 680) along the segments. To this end, System 100 utilizes the positioning data acquired by the positioning utility, (e.g. DGPS 150 and/or INS 160) the calculated EMM 110 mission execution route (divided into one or more segments) and the calculated implement trajectory along the segments. According to certain embodiments, both the mission execution route and the implement trajectory are stored in the Data Repository 255.

System 100 is further configured to compare the current EMM 110 steering direction with the calculated EMM 110 mission execution route (Block 640). In case of a mismatch between the current heading of EMM 110 and the heading specified by the calculated EMM 110 mission execution route, System 100 is configured to fix EMM 110 steering according to the heading specified by the EMM 110 mission execution route (Block 650).

In parallel to steering EMM, System 100 is further configured to position Implement 120 according to the calculated implement trajectory (Block 660). In case of a mismatch between the current Implement 120 positioning and calculated implement trajectory, System 100 is configured to fix Implement 120 position according to the position specified by the calculated implement trajectory (Block 670).

According to certain embodiments, System 100 is further configured to recalculate implement trajectory substantially along the segments in case a discrepancy is found between the actual Implement 120 positioning and the calculated implement trajectory in the same respective time or location along the segment (meaning that Implement 120 is not located as it should according to the calculated implement trajectory). This may occur, for example, when the full motion of Implement 120 becomes limited as a result of a malfunction and it cannot be lowered as required by the implement trajectory. The recalculated implement trajectory substantially along the segments is stored in Data Repository 255. According to further embodiments, in case a recalculation of an implement trajectory is performed, corresponding EMM 110 mission execution route recalculations are performed by Route Calculation Module 225.

While the invention has been shown and described with respect to particular embodiments, it is not thus limited. Numerous modifications, changes and improvements within the scope of the invention will now occur to the reader.

The invention claimed is:

1. A method of autonomous operation of an earth moving machine (EMM) configured for shoving matter, said EMM comprising at least one implement operatively connected to a mission computer, the method comprising:
   (a) receiving, by the mission computer, a mission objective;
   (b) obtaining mapping data in respect of a mission area;
   (c) determining, with help of a positioning utility, a position of said EMM in respect of said mission area;
   (d) determining a mission execution route, based on at least said mapping data and said mission objective, said mission execution route comprising one or more segments within said mission area, wherein each segment is associated with a disposal point;
   (e) calculating, for each of said one or more segments, with the help of the mission computer, an implement trajectory of said at least one implement along said segment, thereby enabling accumulation of matter by said at least one implement along said segment as said EMM progresses, and disposing of said accumulated matter upon arrival at said disposal point, wherein said calculating is based on at least the mission objective, the mapping data, a length of said segment and shoving capability data of said EMM, and wherein the accumulating load on the EMM is not greater than the maximal shoving capability of the EMM; and
   (f) operating said EMM along said mission execution route and repositioning said implement while operating said EMM along at least one of said one or more segments according to said implement trajectory.

2. The method of claim 1 further comprising monitoring at least one characteristic of said EMM and repositioning said at least one implement in response to an indication that said at least one characteristic of said EMM exceeds a predefined threshold value.

3. The method of claim 2 further comprising a stage of recalculating said implement trajectory of said at least one implement substantially along at least one of said one or more segments, in response to said repositioning of said at least one implement.

4. The method of claim 2 further comprising the stage of re-determining one or more segments within said mission area, wherein each of said one or more segments is associated with a disposal point, in response to said repositioning of said at least one implement.

5. The method of claim 2 wherein said characteristic is a mechanical parameter of said EMM.

6. The method of claim 5 wherein said mechanical parameter is an engine RPM.

7. The method of claim 2 wherein said characteristic is EMM tracks sliding.

8. The method of claim 1 wherein said disposal point is located at the end of said at least one segment.

9. The method of claim 1 further comprising monitoring mission performance and recalculating said implement trajectory of said at least one implement substantially along said at least one of said one or more segments, in response to an indication that actual position of said at least one implement differs from the implement trajectory of said at least one implement.

10. The method of claim 9 further comprising the stage of re-determining at least one segment within said mission area, wherein each segment is associated with a disposal point, in response to said repositioning of said at least one implement.

11. The method of claim 1 wherein said accumulated matter is equal to maximal amount of matter that the EMM is capable of shoving.

12. The method of claim 1 wherein said determination of one or more segments in stage (d) is further based on at least one of the following parameters:
   (a) movement from high grounds to low grounds;
   (b) movement in long segments;
   (c) minimal amount of repetitions of segments;
   (d) systematic coverage of the mission area.

13. The method of claim 1 wherein said mission objective comprises at least mission area boundaries.

14. The method of claim 1 further comprising receiving at least one terrain characteristic and utilizing said at least one terrain characteristic in the calculation of said at least one segment and said implement trajectory along said at least one segment.

15. A system for autonomous operation of an EMM, said EMM comprising at least one implement, the system comprising:
a positioning utility, a detection and ranging facility and a mission computer;
said mission computer is configured to receive data in respect of a mission, said data including at least a mission objective;
said detection and ranging facility is configured to scan said mission area and obtain data in respect of the mission area;
said positioning utility is configured to determine a position of said EMM in respect of said mission area;
said mission computer is further configured to:
generate a map of said mission area based on said data;
determine a mission execution route, based on at least said map and said mission objective, said mission execution route comprising at least one segment within said mission area, wherein each segment is associated with a disposal point;
calculate, based on at least said mission objective, said map, a length of said at least one segment and shoving capability data of said EMM, an implement trajectory of said at least one implement along said segment, such that matter is accumulated by said at least one implement along said segment as said EMM progresses and upon arrival at said disposal point, said accumulated matter is disposed and
operate said EMM along said mission execution route and reposition said implement while operating said EMM along at least one of said one or more segments according to said implement trajectory.

16. The system of claim 15 wherein said mission computer is further configured to monitor at least one characteristic of said EMM and reposition said at least one implement in response to an indication that said at least one characteristic of said EMM exceeds a predefined threshold value.

17. The system of claim 16 wherein said mission computer is further configured to recalculate implement trajectory of said at least one implement, substantially along said at least one of said segments, in response to said repositioning of said at least one implement.

18. The system of claim 16 wherein, in response to said repositioning of said at least one implement, said mission computer is further configured to re-determine at least one segment within said mission area, wherein each of said at least one segment is associated with a disposal point.

19. The system of claim 16 wherein said at least one characteristic of said EMM is a mechanical parameter of said EMM.

20. The system of claim 16 wherein said at least one characteristic of said EMM is an engine RPM.

21. The system of claim 16 further comprising an odometer for measuring the distance traveled by the EMM tracks and wherein said at least one characteristic of said EMM is EMM tracks sliding.

22. The system of claim 15 wherein said mission computer is further configured to determine at least one segment wherein said disposal point is located at the end of said at least one segment.

23. The system of claim 15 wherein said mission computer is further configured to monitor mission performance and recalculate said implement trajectory of said at least one implement substantially along said at least one of said segments, in response to an indication that the actual position of said at least one implement differs from the calculated implement trajectory of said implement.

24. The system of claim 23 wherein said mission computer is further configured to re-determine at least one segment within said mission area, where each segment is associated with a disposal point, in response to said repositioning of said at least one implement.

25. The system of claim 15 wherein said accumulated matter is equal to maximal amount of matter that the EMM is capable of shoving.

26. The system of claim 15 wherein said mission computer is further configured to determine said at least one segment based on at least one of the following:
 (a) movement from high grounds to low grounds;
 (b) movement in long segments;
 (c) minimal amount of repetitions of segments;
 (d) systematic coverage of the mission area.

27. The system of claim 15 wherein said mission objective comprises at least mission area boundaries.

28. The system of claim 15 being associated with a data-repository for storing said map and wherein said mission computer is further configured to periodically update said map in accordance with updated mapping data received during performance of the mission.

29. The system of claim 15 wherein said mission computer is further configured to receive at least one terrain characteristic and to utilize said at least one terrain characteristic in the calculation of said at least one segment and said implement trajectory of said at least one implement along said at least one segment.

30. The system of claim 15 wherein said detection and ranging facility is configured to scan an area in front of said EMM and an area behind said EMM.

31. The system of claim 15 wherein said detection and ranging facility is at least one laser scanner.

32. The system of claim 15 wherein said positioning utility is a GNSS.

33. The system of claim 15 wherein said positioning utility is an INS and GNSS integrated system.

34. A system for autonomous operation of an earth moving machine (EMM), said EMM comprising at least one implement, the system comprising a mission computer configured to determine a mission execution route comprising at least one segment associated with a disposal point and calculate an implement trajectory of said at least one implement along said at least one segment, such that matter is accumulated by said at least one implement along said at least one segment as said EMM progresses and upon arrival at said disposal point, said accumulated matter is disposed, wherein said calculation of said implement trajectory is performed such an amount of said accumulated matter does not exceed a maximal shoving capability of said EMM.

* * * * *

UNITED STATES PATENT AND TRADEMARK OFFICE
CERTIFICATE OF CORRECTION

PATENT NO. : 8,983,738 B2
APPLICATION NO. : 13/579691
DATED : March 17, 2015
INVENTOR(S) : Avitzur Oren et al.

It is certified that error appears in the above-identified patent and that said Letters Patent is hereby corrected as shown below:

On the Title Page, Item (75)

Please delete "(75) Inventors: Oren Avitzur, Biet El (IL); Gil Shalev Balashnikov, Omer (IL)" and insert --(75) Inventors: Avitzur Oren; Biet El (IL); Gil Shalev Balashnikov, Omer (IL)--

Signed and Sealed this
Seventh Day of July, 2015

Michelle K. Lee
*Director of the United States Patent and Trademark Office*